Dec. 25, 1962 J. W. RYAN Re. 25,308

CAP GUN WITH PENDULUM MEANS FOR PRODUCING SOUND

Original Filed Sept. 22, 1958 4 Sheets-Sheet 1

JOHN W. RYAN,
INVENTOR.

BY HERZIG & JESSUP,
ATTORNEYS.

Albert M. Herzig

Dec. 25, 1962 J. W. RYAN Re. 25,308

CAP GUN WITH PENDULUM MEANS FOR PRODUCING SOUND

Original Filed Sept. 22, 1958 4 Sheets-Sheet 2

JOHN W. RYAN,
INVENTOR.

BY HERZIG & JESSUP,
ATTORNEYS.

Albert M. Herzig

CAP GUN WITH PENDULUM MEANS FOR PRODUCING SOUND

Original Filed Sept. 22, 1958 4 Sheets-Sheet 3

JOHN W. RYAN,
INVENTOR.
HERZIG & JESSUP,
ATTORNEYS.
BY
Albert M. Herzig

CAP GUN WITH PENDULUM MEANS FOR PRODUCING SOUND

Original Filed Sept. 22, 1958 4 Sheets-Sheet 4

JOHN W. RYAN,
INVENTOR.

BY HERZIG & JESSUP,
ATTORNEYS.

Albert M. Herzig

United States Patent Office

Re. 25,308
Reissued Dec. 25, 1962

25,308

CAP GUN WITH PENDULUM MEANS FOR PRODUCING SOUND

John W. Ryan, Los Angeles, Calif., assignor to Mattel, Inc., Hawthorne, Calif., a corporation of California Original No. 2,962,830, dated Dec. 6, 1960, Ser. No. 762,350, Sept. 22, 1958. Application for reissue June 11, 1962, Ser. No. 202,942
23 Claims. (Cl. 42—57)

Matter enclosed in heavy brackets [ ] appears in the original patent but forms no part of this reissue specification; matter printed in italics indicates the additions made by reissue.

This invention relates to a toy gun, and more particularly to a toy gun having a realistic outer appearance and being capable of rapidly and selectively firing a strip or roll of percussion caps and/or emitting a resounding simulated firing sound for more realistic play.

It is an object of this invention to provide a new and improved toy gun which provides, in a realistic appearing housing, means for firing a strip or roll of percussion caps in rapid succession, said means being powered by spring means which is capable of being manually preloaded and reset, and of being controlled by manually operated trigger means extending outwardly of the housing for instantly stopping and starting the action of the cap firing means.

It is a further object of this invention to provide a pendulum means associated with the cap firing means for regulating the timing of the firing of the caps to achieve a more realistic firing order.

It is another object of this invention to provide additional or optionally alternate means for producing a resounding and simulated firing noise, operable by the spring power means, which may be selectively substituted for the cap firing means whereby a simulated firing sound may be produced when the percussion caps are exhausted, or to economize on the use of percussion caps, such selection being quickly and easily achieved by means accessible on the exterior of the housing.

A still further object of this invention is to provide a more realistic action in a toy gun by providing a new and improved bolt means which is indirectly operated by the power means to simulate the bolt action of an actual automatic gun in which a sliding bolt is normally actuated after each shot, such action being visible from the exterior of the gun.

Yet another object of this invention is to provide a new and improved toy gun which is economical to manufacture, capable of mass production, and of interchangeability of parts thereof.

It is a general object of this invention to provide a new and improved toy gun which overcomes disadvantages of prior devices heretofore intended to accomplish generally similar purposes.

These and other objects will be more apparent in view of the accompanying detailed description, drawings, and appended claims.

In the drawings:

FIG. 8 is a fragmentary view illustrating the relationship of the hammer means to the clapper means, with the clapper means in a disengaged position, as seen from the interior of the housing;

FIG. 9 is a view, similar to FIG. 8, illustrating the hammer means and clapper means as viewed from the exterior of the housing, with a portion of the housing broken away for clarity; and FIG. 10 is an exploded perspective view, in elevation, of the gear means and star wheel means, illustrating said means and the ratchet means therebetween more clearly.

Figure 1:
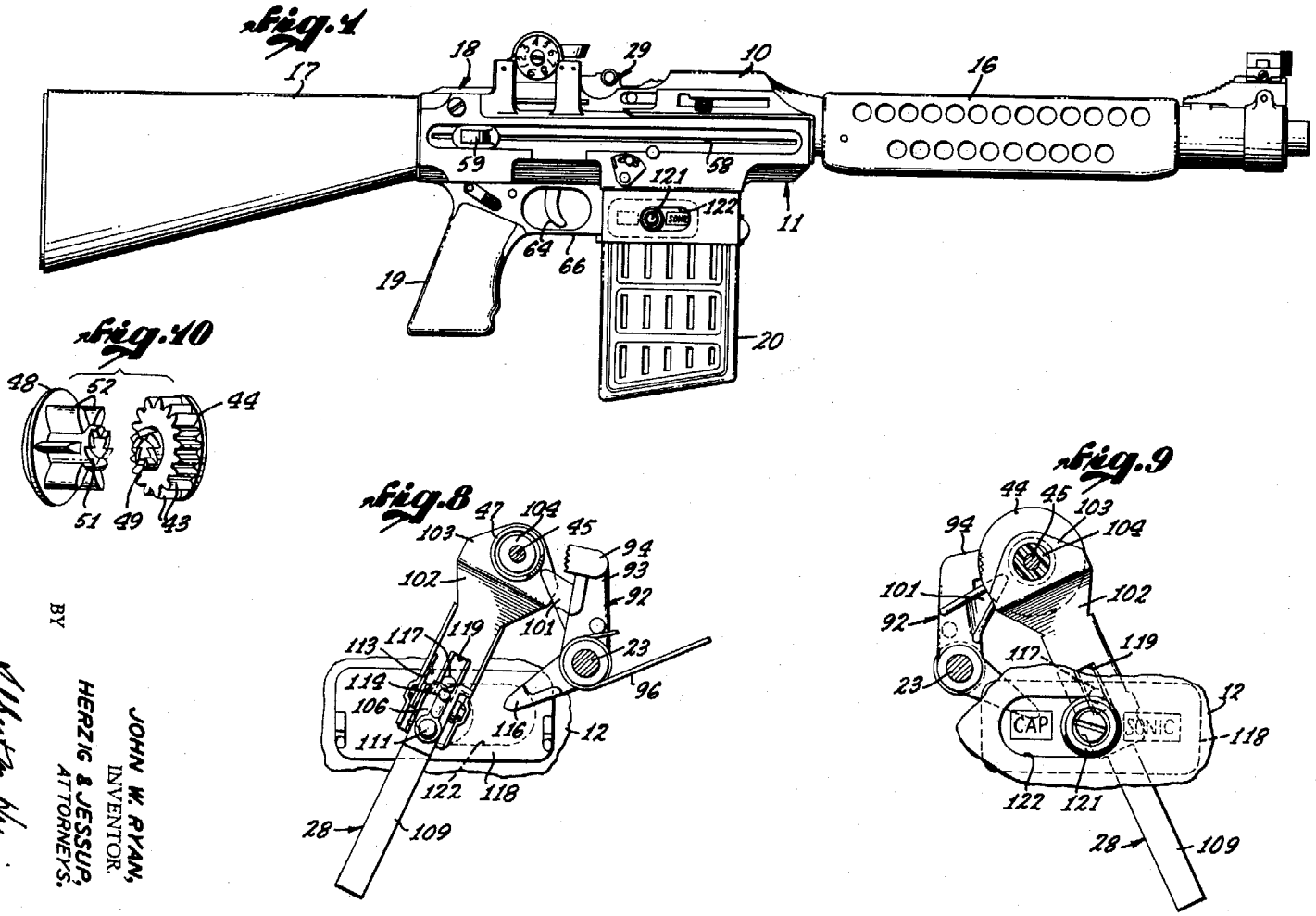
FIG. 1 is a side view, in elevation, of a toy gun designed and constructed in accordance with this invention.

Referring more particularly to the drawings, there is shown by way of illustration, but not of limitation, a toy gun generally designated by the numeral 10 which comprises a substantially hollow housing 11, cast or otherwise formed from any suitable material such as plastics, metal, or the like, which, as illustrated, is advantageously formed of a pair of concave housing portions 12 and 13 cemented or otherwise secured as along their parting lines 14 in face-to-face relationship.

The housing 11 comprises a forwardly extending barrel portion 16, a rearwardly extending stock portion 17, and an intermediate breech portion 18 having a hand grip 19 and a simulated magazine portion 20 depending therefrom. The two halves 12 and 13 of the housing thus form a hollow chamber 21 in which the operating parts of the gun are disposed. The operating mechanism of the toy gun comprises generally: a rocker means 22 rotatably mounted on a transverse pin 23 for oscillatory movement thereon, and having a rearwardly extending inertia or pendulum means 24 for dampening the oscillatory movement thereof as will be hereinafter described; an actuating means 26 for effecting an oscillatory movement of the rocker means 22; a cap firing means 27, operatively associated with said actuating means; a clapper means 28, operatively associated with the cap firing means; a bolt means 29 operatively associated with the rocker means 22; and a trigger means 30 for selectively locking and releasing the rocker means 22 thereby selectively stopping or starting operation of the cap firing means and the clapper means.

The actuating means 26 comprises an elongated relatively flat rack 31 adapted for linear movement along the longitudinal axis of the housing 11, a gear means for translating the linear motion into a rotary motion, and a star wheel including a plurality of radial teeth, to provide the oscillatory movement of the rocker means. The rack 31 is slidingly disposed on an elongated guide rod 32, of cylindrical or other configuration, by means of a transversely bent tab 33 at its forward end, the guide rod 32 extending through an aperture 34 of the tab. The guide rod 32 is fixed within the housing 11 as by inwardly extending projections 36 at the forward end of the housing and by similar projections 37 at the rearward end thereof. The guide rod 32 is preferably flared or otherwise enlarged at the rearward end thereof, as indicated at 38, to form an abutment for one end of a spring 39 comprising a power storing means supported by the rod. The spring power means 39 comprises a helically coiled spring loosely disposed on the guide rod 32 and having its other end 41 in abutment with the transverse tab 33 of the rack 31 whereby the expansion force of the spring means 39 is transmitted to the rack 31 to effect a linear movement thereto.

The rack 31 is provided, on a substantial portion of its lower edge, with a plurality of gear teeth 42 for engagement with the teeth 43 of a gear means or cogwheel 44 rotatably mounted on a transverse shaft 45 of the housing 11, thereby translating the linear motion of the rack 31 into a rotary motion of the gear 44 when the rack is actuated. A bearing pad 40 is preferably provided in the housing 11 to guide the rack and reduce wear of the material of the housing.

Figure 5:
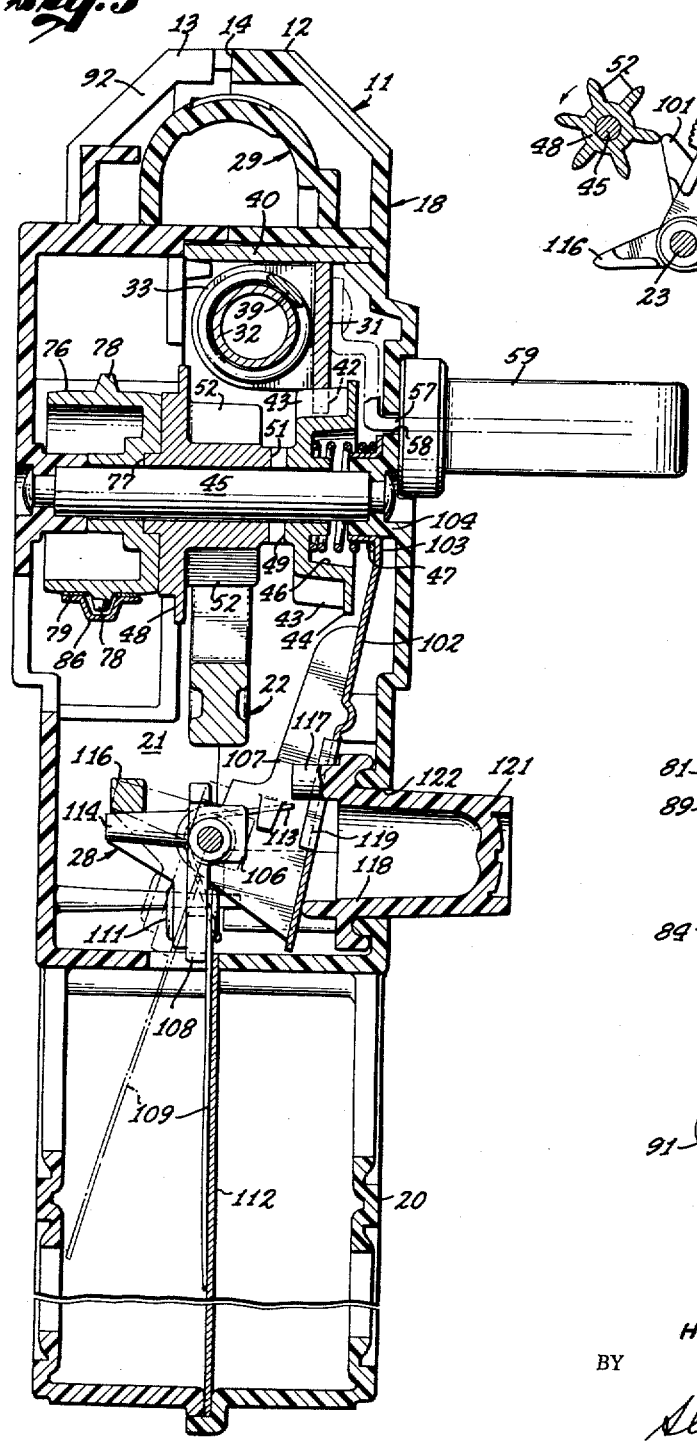
FIG. 5 is an enlarged vertical cross-sectional view as taken substantially along a line 5—5 of FIG. 2.

As best seen in FIGS. 5 and 10, the gear 44 is provided on its outer vertical face with a spring barrel 46 which accommodates one end of a spring 47 interposed between the gear 44 and the wall of the housing portion 12 to urge the gear 44 inwardly towards a star wheel 48 rotatably and coaxially mounted on the shaft 45. The adjacent faces of the gear 44 and the star wheel 48 are provided with complementary ratchet teeth 49 and 51, respectively, which couple the gear 44 and star wheel 48 for rotation in one direction, that is, counter-clockwise as viewed in FIGS. 2, 3, and 7, when the spring power means 39 effects a linear motion to the rack 31, the teeth 49 ratcheting over the teeth 51, without causing movement of the star wheel 48, when the rack 31 is drawn in a rearward direction to reset the rack, as will be hereinafter described.

The star wheel 48 comprises a plurality of radial teeth 52, six such teeth being illustrated herein, which serve to actuate the rocker means 22 and the cap firing means 27, when rotated, as will hereinafter be described.

The rotation of the gear means 44, in response to the linear movement of the rack 31, is preferably regulated to effect an intermittent rotary movement thereof for a purpose which will be hereinafter described. The rocker means 22 is provided to restrict the gear means and the star wheel to obtain an intermittent rotary movement and, as previously described, is rotatably mounted on the transverse shaft 23 for oscillatory movement thereon in a vertical plane substantially parallel to the longitudinal axis of the housing 11.

Figure 2:
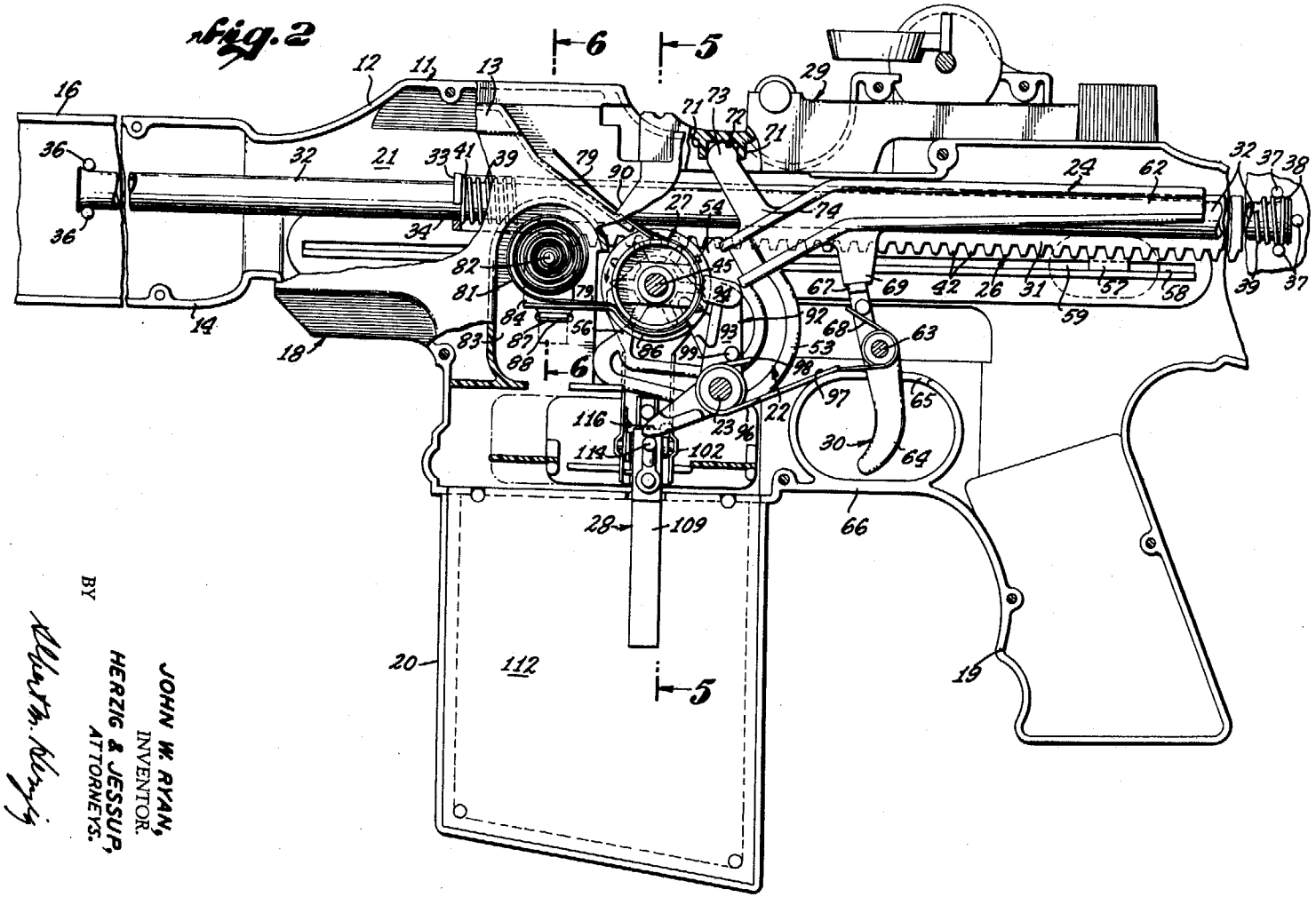
FIG. 2 is an enlarged fragmentary vertical sectional view as taken along the vertical longitudinal bisecting plane, or parting line thereof, with parts shown in elevation.
Figure 3:
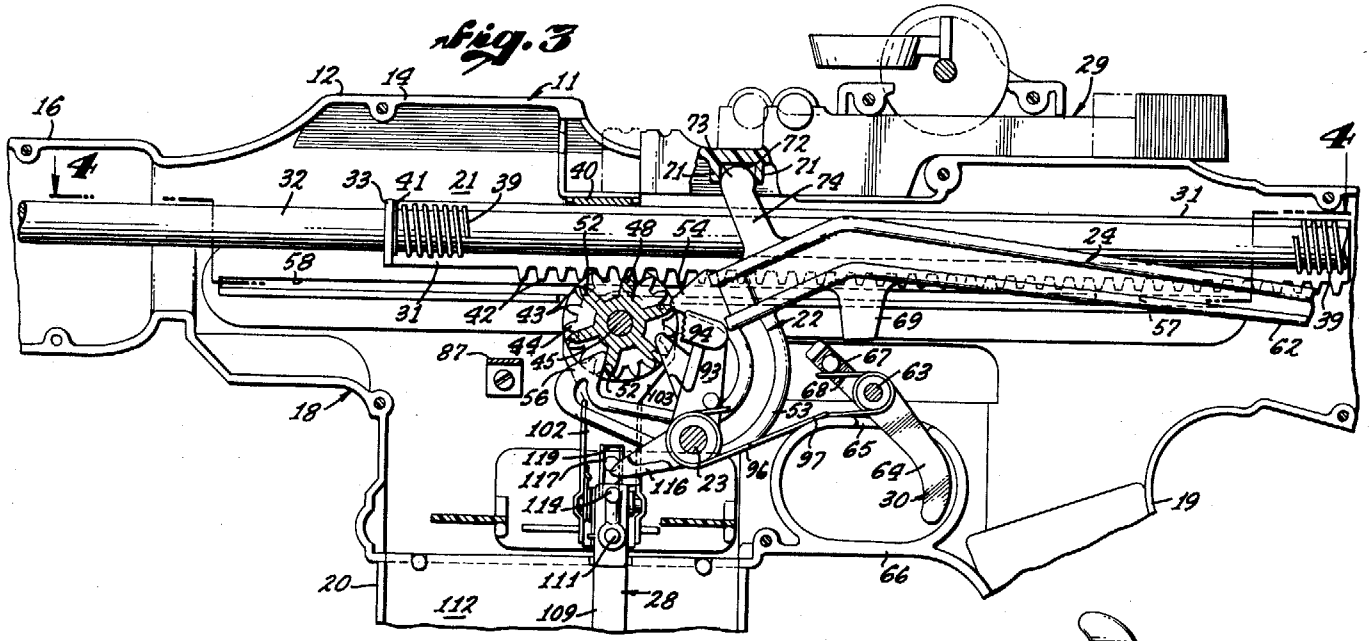
FIG. 3 is an enlarged view, similar to FIG. 2, with parts broken away for greater clarity, and showing operative parts thereof in another position.
Figure 4:
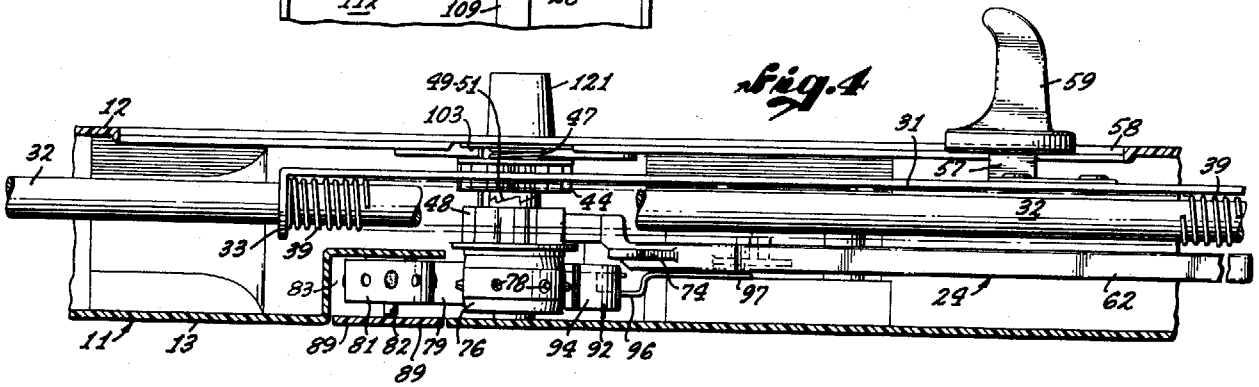
FIG. 4 is a horizontal cross-sectional view as taken substantially along a line 4—4 of FIG. 3.

The rocker means 22 includes an arcuate portion 53 generally surrounding a portion of the star wheel 48 and having inwardly extending teeth-like portions 54 and 56 in the proximity of the star wheel 48. The teeth 54 and 56 are spaced apart so when one tooth, like the tooth 56 in FIG. 3, is in engagement with a radial tooth 52 of the star wheel 48 the other tooth 54 clears its adjacent tooth 52 of the wheel 48 and conversely, as seen in FIG. 2, when the tooth 54 is within the space between radial teeth 52 of the wheel 48, the other tooth 56 clears its adjacent radial tooth 52 thereby being out of engagement with the wheel 48. As the star wheel 48 is rotated, a tooth 52 thereof bears against a tooth 54 or 56 of the rocker means 22 to cam one outwardly and the other inwardly. More specifically, as the star wheel 48 rotates in a counter-clockwise direction, if the rocker means 22 is in the position illustrated in FIG. 2, a radial tooth 52 will bear against the tooth 54 of the rocker means 22 around the shaft 23 and thereby cause the opposite tooth 56 to enter a space between its adjacent radial teeth 52. Subsequently, another radial tooth 52 will cam the tooth 56 outwardly, and thereby swing the tooth 54 inwardly, thereby producing an oscillatory movement to the rocker means 22, the rocker means rocking back and forth with the teeth 54, 56 alternately being moved in and out of engagement with the star wheel 48. This rocking motion causes an intermittent rotation of the star wheel 48 and the gear means 44 and an intermittent linear movement of the rack. The gear means 44 and star wheel 48 comprise a rotary means driven by the rack 31 for converting the longitudinal movement of the rack into a cyclical movement of the driven means or rocker means 22, and the teeth or projections 54 and 56, coacting with the radial teeth 52, comprise a means to operate the driven means and the pendulum means or inertia means 24 connected thereto.

As will be apparent from the foregoing description, the rack 31 is slidably mounted on the guide rod 32 for linear movement substantially parallel to a longitudinal axis of a housing 11 and is driven by a spring power means 39 which is disposed on the guide rod 32 to effect a compressive force when preloaded against the transverse tab 33 of the rack 31. The rack 31, by means of engagement of its gear teeth 42 with gear teeth 43 of a gear 44, transmits the linear motion thereof to the gear 44 which is translated into a rotary motion of the gear 44 in a counter-clockwise direction. In this rotary motion, the gear 44 is coupled to the star wheel 48, by means of ratchet teeth 49 and 51 respectively thereof, to rotate the star wheel 48 and thereby cause the rocker means 22 to oscillate back and forth by alternately ejecting or camming the teeth 54, 56 of the rocker means outwardly of the star wheel 48.

When the rack 31 has traveled forwardly to an extent whereby the rearward end of the rack is in proximity with the gear 44, the rack 31 may be manually returned to a loaded position, to the right, as viewed in FIGS. 2 and 3, to compress the spring 39 thus resetting and reloading the rack and spring. For this purpose, the rack is provided with a transverse tab 57 extending outwardly of the housing 11 through a slot 58 of the housing portion 12. A finger piece 59 is fixed to the tab on the end outside of the housing. In the rearward return movement of the rack 31, the ratchet teeth 49 of the gear 44 ratchet over the ratchet teeth 51 of the star wheel 48, against the spring 47, thereby permitting the gear 44 to rotate in a clockwise direction without rotating the star wheel 48.

The oscillatory movement of the rocker means 22 is preferably dampened to effect a smoother, quieter and shockless operation. For this purpose, the pendulum means 24 is provided, integral with the rocker means or optionally fixed thereto. The pendulum means 24 includes a rearwardly extending mass portion 62 of sufficient length and weight to provide a desired resistance to the oscillation of the rocker means 22.

In order to start and stop the oscillatory movement of the rocker means 22, the trigger means 30 is rotatably mounted, adjacent the rocker means 22, on a transverse shaft or pin 63 and includes a finger piece 64 extending outwardly of the housing 11 through an opening 65 thereof and into the area encircled by a trigger guard 66 of the housing 11. The trigger means 30 includes an upwardly extending portion 67 which forms a stop member to prevent downward movement of the rocker means and pendulum means when the trigger means is in its normal spring-biased position shown in FIG. 2. In this position, a torque spring 68 urges the stop member 67 upwardly and rearwardly into abutment with a depending extension 69 of the rocker means 22 thereby preventing downward movement of the pendulum means 24. The trigger means 30 is stopped in this position by abutment of the finger piece 64 with the forward wall of the opening 65 and is retained in the position by the spring 68 until manually released by manual actuation of the finger piece 64. The trigger means 30 may be rotated around the shaft 63 to remove the stop member 67 from abutment with the depending tab 69 thus permitting the rocker means 22 and its pendulum means 24 to oscillate as long as the trigger means is depressed, that is, rotated counterclockwise as illustrated in FIG. 3.

To provide an outwardly visible realistic action to the gun, the bolt means 29 is slidably disposed on the housing 11 for linear movement substantially parallel to the longitudinal axis of the housing 11 to provide a means for simulating a reciprocating element of an actual gun. The bolt means 29 is provided with a pair of depending ribs 71 forming a pocket 72 therebetween in which the upper end 73 of an upwardly extending finger 74 of the rocker means 22 is disposed. The finger 74 therefore constitutes an operating means driven by the actuating means 26. As the rocker means 22 oscillates to raise the pendulum 24 upwardly, as seen in FIG. 2, the finger 74 translates the oscillatory movement of the rocker means 22 into a forward linear movement of the bolt means 29. As the rocker member oscillates to lower the pendulum means 24, as seen in FIG. 3, the finger 74 translates the oscillatory movement into a rearward linear movement of the bolt 29. Thus, as the rocker means 22 oscillates, the bolt 29 reciprocates forwardly and rearwardly from the position shown in FIG. 2 to the position shown in FIG. 3 and then back again to FIG. 2.

Figure 6:
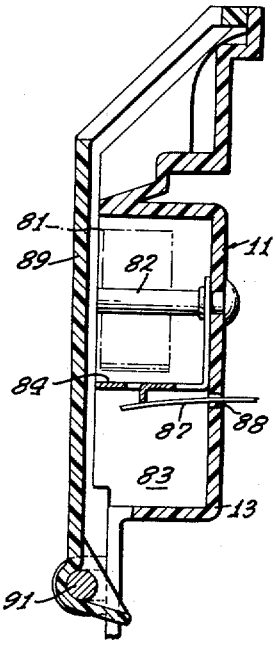
FIG. 6 is an enlarged fragmentary vertical cross-sectional view as taken substantially along a line 6—6 of FIG. 2.

The intermittent rotary motion of the gear 44 and its coupled star wheel 48 is used to actuate the cap firing means 27 of the mechanism in the following manner. The cap firing mechanism 27 includes a cylindrical anvil means 76 rotatably disposed on the transvere shaft 45 and keyed as indicated at 77 to the star wheel 48 for transmission of the rotary motion of the star wheel to the anvil means 76. The anvil 76 supports the perforated strip 79 of a roll 81 of percussion caps around a substantial portion of its periphery, and is provided with outwardly extending radial frusto-conical projections 78 for engagement with the perforations of the strip 79. The roll 81 is supported as on a transverse pin 82 of a cap roll compartment 83 integral with the housing portion 13 of the housing 11. As best seen in FIGS. 2 and 6, a cap retainer bracket 84 is pivotally mounted on the pin 82, and includes a rearwardly extending arcuate portion 86 which encircles a portion of the periphery of the anvil 76 to retain the strip 79 in intimate contact with the periphery of the anvil 79 and prevent inadvertent disengagement of the perforations of the strip 79 with the radial projections 78. The cap retainer 84 is biased upwardly against the anvil 76 by a leaf spring 87 fixed to the housing 11 and extending through an opening 88 of the compartment 83.

In order to load a new roll of caps, the bracket 84 may be manually swung downwardly, away from the anvil 76, to permit initial wrapping of the strip 79 around the anvil 76 after a new roll 81 has been installed over the pin 82. The bracket 84 may then be released to allow the spring 87 to urge the arcuate portion 86 against the anvil 76 to retain the strip 79 thereon. A cover 89 is preferably provided to enclose the compartment 83, the cover being pivoted as on a pin or shaft 91 (see FIG. 6). An opening 90 is provided in the upper portion of the housing portion 13 to provide an exit for the spent strip 79 after being fired.

Figure 7:
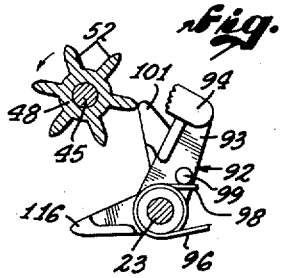
FIG. 7 is a fragmentary view showing the star wheel, and the hammer means in one of their operating positions.

The cap firing means further includes a hammer means, generally indicated by the numeral 92, which is rotatably mounted on the transverse shaft 23, coaxially with the mounting of the rocker means 22, for oscillatory movement around the shaft 23. The hammer means includes an upwardly extending portion 93 having an enlarged hammer portion 94 at the upper end thereof. A torque spring 96 is provided circumjacent the shaft 23 having one end 97 thereof in abutment with a portion of the housing and the other end 98 in abutment with a transverse pin 99 of the upwardly extending portion 93 to bias the portion 93 in a counter-clockwise direction, as viewed in FIGS. 2 and 3, thereby biasing the hammer portion 94 against the anvil 76 to strike the anvil and fire a percussion cap aligned therewith. As best seen in FIGS. 2, 3 and 7, the hammer means is provided with a forwardly and upwardly extending lever means in the form of an actuator finger 101 which is extensible between the radial teeth 52 of the star wheel 48. When the star wheel 48 is rotated as previously described, a tooth 52 cams the actuator finger 101 outwardly of the star wheel to bias the hammer means 92 against the force of the torque spring 96 and away from the anvil 76. As the tooth 52 is rotated out from under the finger 101, as will occur immediately after the position shown in FIG. 7, the spring 96 is free to bias the hammer 94 against the anvil. This action is a fast snapping action, thereby delivering a forceful striking blow to the anvil and firing the cap which is supported on the anvil.

As will now be clearly understood by the foregoing description, the rotation of the star wheel 48 is transmitted to the anvil 76 to rotate the anvil 76 and position a new cap of the strip 79 of percussion caps supported thereon into the path of the hammer 94 which is biased by the spring 96 against the anvil 76 to fire the cap. As the star wheel 48 is permitted to subsequently rotate by the rocking motion of the rocker means 22, a new cap is again advanced to the striking position while a radial tooth 52 cams the actuator finger 101 outwardly to bias the hammer 94 against the spring 96 and away from the anvil 76 until the tooth 52 advances sufficiently to release the hammer means whereby the spring 96 snaps the hammer 94 towards the anvil to strike the anvil and fire the cap.

An important feature of this invention is the provision of alternate means of producing a resounding noise to simulate the firing of a gun. In the preceding description, the cap firing means has been described, providing one means of producing the simulated firing noise. In order to economize on the use of caps, or provide a resounding noise when such a roll of caps is exhausted, the clapper means 28 is provided within the housing and operatively associated with the hammer means 94 whereby a resonant clapping sound may be substituted for the cap firing sound or optionally produced simultaneously therewith.

The clapper means 28 is mounted within the housing 11 adjacent the hammer means 92 and includes a generally U-shaped bracket 102 having an upper portion 103 pivotally mounted on an inwardly extending boss 104 of the housing portion 12, conveniently coaxial with the shaft 45. A trunnion 106 is rotatably mounted in the lower portion of a pair of inwardly extending side walls 107 of the bracket 102 and includes a depending leg 108 to which a clapper 109 is fixed by a rivet 111, or the like. The clapper 109 is normally urged outwardly and away from a diaphragm 112, rigidly suspended within the magazine portion 20 of the housing 11, by a torque spring 113. The trunnion 106 includes a transverse projection 114 which extends into the path of a depending actuator finger 116 of the hammer means 92.

By this construction, as the hammer means 92 is oscillated back and forth, as previously described, to and from the anvil 76, the depending actuator finger 116 is brought into engagement with the transverse projection 114 thereby biasing the clapper 109 against the bias of the spring 113 and into a forceful contact with the diaphragm 112 to produce a resounding clapping noise. When the hammer means 92 is oscillated to bias the hammer 94 away from the anvil 76, the actuator finger 116 is removed from contact with the projection 114 whereby the spring 113 is permitted to bias the clapper 109 away from the diaphragm 112. Thus, repeated oscillation of the hammer means 92, as previously described, result in repeated biasing of the clapper 109 into the diaphragm 112 to produce a repetitive resounding sound as long as the rack 31 is actuated.

The bracket 102 is retained in the position in which the projection 114 is in the path of the finger 116 by an inwardly extending projection 117 of a slide member 118 slidably mounted on the wall 12 of the housing 11. The projection 117 extends into a vertical slot 119 of the bracket 102. The slide 118 includes a knob 121 extending transversely therefrom and through a horizontal slot 122 in the wall 12 for manual manipulation thereof outside of the housing 11. The slide 118 is shiftable, relative to the housing 12, and is limited by the movement of the knob 121 within the slot 122. As best seen in FIGS. 8 and 9, the knob 121 may be manually actuated to slide the slide 118 to its limits to the right as viewed in FIGS. 2 and 3 whereby the projection 114 of the clapper means 28 is in the path of the actuator finger 116. As viewed in FIGS. 8 and 9, the knob 121 is illustrated as being shifted to the opposite extremity of the slot 122, to the right as viewed in FIG. 9 and to the left as viewed in FIGS. 2, 3 and 8, whereby the pin 117, engaging the slot 119 of the bracket 102, pivots the bracket 102 about the axis of the boss 104 to move the clapper means 28 into the position shown in FIGS. 8 and 9 and out of the path of the actuator finger 116 of the hammer means 92. In this position (FIGS. 8 and 9) only the cap firing sound is effected, as indicated by the legend "Cap" on the slide 118, in FIG. 9, where the legend "Sonic" is hidden behind the wall 12. When the knob 121 is shifted to the left as viewed in FIG. 9, the legend "Cap" is hidden by the wall 12, while the legend "Sonic" is exposed to indicate that the clapper means is engageable for producing a resonant clapping sound as heretofore described. The hammer means 92 and the clapper means 28 may be termed cyclical sound producing means which are operated by the lever means 101 from the rotary means 44—48.

It has been found that to produce the most effective striking force to the anvil by the hammer means, it is preferable to remove the clapping clapper means 28 from effectiveness by the actuator finger 116 whereby the full force of the spring 96 is transmitted to the hammer 94 in delivering the striking blow against the cap. When the caps have been exhausted, or if it is desired to economize on the use of caps and still produce a resounding noise, the knob 121 may be shifted to a position whereby the clapping clapper means 28 is positioned as viewed in FIGS. 2 and 3 to transmit the force of the spring 96, through the hammer means 92, to the trunnion 106 whereby the clapper 109 is swung rapidly and forcefully against the diaphragm 112 to produce the resounding clapping sound.

Throughout the operation of the gun mechanism, the force of the spring power means 39, effecting the linear motion of the rack 31, is constant. The producing of the sound is continuous and intermittent as long as the trigger means 30 is manually actuated to permit the rocker means 22 to oscillate. All motion of the parts herein described is instantly halted when the trigger means 30 is released and the stop member 67 is biased by the spring 68 into interference of movement of the rocker means 22 by abutment with the depending projection 69. When the rack means 31 has reached its fullest extent of position as determined by abutment by the tab portion 33 with the inwardly extending projection 36 of the housing 12, the spring 39 and rack 31 may be instantly and easily reset and reloaded by manually pulling rearwardly against the finger-piece 59 extending outwardly of the housing.

In general, this invention comprises a substantially hollow housing having an outer appearance generally simulating its real counter-part, and having therein a spring power means adapted to impart a linear movement, along the longitudinal axis of the housing, to a rack means slidably mounted therein for rotating a star wheel or gear means which is operatively associated with the rack means and a rocker means for translating the linear motion of the rack means into an oscillating movement of the rocker means whereby the rotation of the gear means is intermittently halted by the rocker means to produce a stepping motion of the rack means and an intermittent rotational movement of the gear means.

The oscillatory motion of the rocker means is dampened by a pendulum integral with or optionally attached thereto. A cap firing means comprising an anvil, adapted to support a strip or roll of percussion caps, is coaxially mounted with the gear means and is adapted to be rotated in one direction by ratchet means provided between the gear means and the anvil means whereby the strip of caps is intermittently advanced along the periphery of the anvil. A hammer means is pivotally mounted in the housing on a transverse axis and is adapted to be swung back and forth, or oscillated, by the engagement of a star wheel with an actuator finger extending from the hammer means, the hammer means being biased towards the anvil means, to strike thereon, by a spring, and being retracted from the anvil by the action of the star wheel on the actuator finger.

A second actuator finger depends from the hammer means and is engageable with a clapper means which is pivotally mounted within the housing for oscillatory movement in a transverse direction, for transmitting the intermittent oscillatory movement of the hammer means to the clapper means, whereby the clapper means may be actuated to produce a resounding clapper noise against a diaphragm, within the housing, to simulate a firing noise. The clapper means may be selectively disengaged from the depending actuator finger of the hammer means whereby the clapping noise is omitted while the hammer is allowed to strike the anvil to fire the percussion caps.

A trigger means is provided in the housing and extends therefrom for manual manipulation and is spring biased to releasably lock the rocker means against oscillatory movement. When the rocker means is locked by the trigger means in the normal spring biased position of the trigger means, the star wheel is prevented from rotation by means of an inwardly extending portion of the rocker means which is held in abutment with the star wheel, thus preventing it from rotation. In the locked position, the star wheel is held stationary and no motion is transmitted to the hammer means or the clapper means.

To add further realism to the action of this instant invention a bolt means is provided on the housing for linear movement along the longitudinal axis thereof, and is reciprocated back and forth by means operatively associated with the bolt means and the rocker means whereby oscillation of the rocker means is translated into a linear reciprocating movement of the bolt means.

Means are provided for resetting of the rack means when the spring power means is fully extended, by providing an extension on the rack means accessible on the exterior of the gun whereby an operator may grasp such an extension and pull backwardly thereon to draw the rack rearwardly until the spring power means is fully compressed. The spring means is held in this compressed state by the locking action previously described where the rocker means is held in engagement with the star wheel, by means of the trigger means, until the trigger means is manually actuated to release the rocker means.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

What I claim as new and desire to secure by Letters Patent is:

1. A toy gun, comprising: a substantially hollow housing simulating an actual gun; rocker means mounted for oscillatory movement on a transverse axle in said housing; actuating means for effecting oscillatory movement of said rocker means about said transverse axle; *said actuating means comprising rack means and rotary means driven by said rack means*; power storing means for moving said [actuating] *rack* means; pendulum means connected to said rocker means for dampening the oscillatory movement of said rocker means and the movement of said actuating means; percussion sound means; and means mounted in said housing and operatively connected to said actuating means and said percussion sound means, for actuating the latter.

2. A toy gun in accordance with claim 1, including manually operable trigger means having one end thereof adjacent said pendulum means and another end thereof extending outwardly of said housing for selective manual manipulation, said trigger means being rotatably mounted on a transverse shaft mounted in said housing; and spring means for releasably biasing said one end into engagement with said pendulum means for stopping the movement of said pendulum means, rocker means, and actuating means, whereby manual actuation of said other end rotates said trigger means in a direction opposite to the bias of the spring means, thereby disengaging said one end for releasing said pendulum means, rocker means, and actuating means.

3. A toy gun in accordance with claim 1, wherein said [actuating] *rack* means includes a member mounted in said housing for sliding linear movement along the longitudinal axis of said housing, *and wherein said rotary* means *are provided* for translating said linear movement of said last-mentioned member into oscillating movement of said rocker means.

4. A toy gun comprising: a substantially hollow housing simulating an actual gun; rocker means rotatably mounted for oscillatory movement on a transverse axle in said housing; actuating means connected with said rocker means to effect oscillatory movement thereof; *said actuating means comprising rack means and rotary means driven by said rack means*; power storing means for moving said [actuating] *rack* means; pendulum means connected with said rocker means to dampen the oscillatory movement of said rocker means and the movement of said actuating means; cap-firing means mounted in said housing and operatively connected with said actuating means; and trigger means operatively connected to said rocker means for selectively and manually stopping and releasing said oscillatory movement of said rocker means, thereby stopping and starting said actuating means.

5. A toy gun in accordance with claim 4, wherein said cap-firing means includes an actuator member depending therefrom, and wherein clapper means are provided in said housing and operatively connected to said actuating means of said cap-firing means for producing a resonant clapping sound.

6. A toy gun in accordance with claim 5, including means for manually and selectively engaging and disengaging said clapper means from said actuator member of said cap-firing means.

7. A toy gun in accordance with claim 5, wherein said [actuating] *rack* means includes means slidably mounted in said housing for linear movement along the longitudinal axis of said housing, and wherein *said rotary* means are provided for translating linear reciprocating movement of said [actuating] *slidable* means into oscillatory movement of said rocker means.

8. A toy gun comprising: a hollow housing simulating an actual gun; rack means slidably mounted in said housing for linear movement along a longitudinal axis thereof; spring power storing means for transmitting linear movement to said rack means; rocker means in said housing adjacent said rack means, said rocker means being pivotally mounted for oscillatory movement around a transverse axis of said housing; gear means rotatably mounted on a transverse member in said housing and being operatively connected with said rack means and said rocker means for translating the linear movement of said rack means into an oscillatory movement of said rocker means; pendulum means connected with said rocker means for regulating said oscillatory movement and thereby regulating rotation of said gear means; and means operatively connected with said gear means for actuating a percussion sound means.

9. A toy gun in accordance with claim 8 including manually operable trigger means operatively connected to said rocker means for selectively starting and stopping said oscillatory motion of said rocker means.

10. A toy gun comprising: a hollow housing simulating an actual gun; rack means slidably mounted in said housing for linear movement along a longitudinal axis of said housing; spring power storing means for selectively transmitting linear movement to said rack means; rocker means adjacent said rack means and adapted for oscillatory movement around a transverse axis in said housing; gear means rotatably mounted on a transverse axis in said housing; star wheel means operatively connected to said gear means and said rocker means for translating the linear movement of said rack means into an oscillatory movement of said rocker means; pendulum means connected to said rocker means to dampen movement of said rocker means; trigger means operatively connected to said rocker means for selectively and manually stopping and starting said oscillatory movement of said rocker means, thereby stopping and starting said star wheel means; anvil means coaxially mounted with said gear means and said star wheel to support a series of percussion caps; ratchet means operatively connected to said gear means and said star wheel means for driving said star wheel means and said anvil means in one direction; hammer means rotatably mounted adjacent said anvil means; and an actuator finger on said hammer means spring biased into engagement with said star wheel means, whereby rotation of said star wheel means is translated into an oscillatory movement of said hammer means for striking said caps on said anvil means.

11. A gun in accordance with claim 10, wherein spring means are employed to normally urge said hammer means against said anvil.

12. A gun in accordance with claim 10, including a clapper means pivotally mounted in said housing adjacent said hammer means for oscillatory movement transversely relative to the longitudinal axis of said housing and wherein said hammer means includes a second actuator finger depending therefrom, said second actuator finger being adapted to engage said clapper means for translating the oscillatory movement of said hammer means into an oscillatory movement of said clapper means for producing a resounding clapping sound in said housing.

13. A gun in accordance with claim 12, including means for manually and selectively engaging and disengaging said clapper means from said second actuator finger of said hammer means.

14. A toy gun in accordance with claim 13, including bolt means slidably mounted on said housing for linear movement along the longitudinal axis of said housing; and means operatively connected to said rocker means and said bolt means for translating said oscillatory movement of said rocker means into linear reciprocal movement of said bolt means.

15. A toy gun in accordance with claim 14, including manually operable means connected with said rack means and extending outwardly of said housing for manually preloading said spring power means.

16. A toy gun comprising: a substantially hollow housing simulating an actual gun; rocker means mounted for oscillatory movement on a transverse axis in said housing; actuating means for effecting oscillatory movement of said rocker means about said transverse axis; *said actuating means comprising rack means and rotary means driven by said rack means*; power storing means for moving said [actuating] *rack* means; pendulum means connected to said rocker means for limiting the rate of movement of said actuating means and rocker means; means for simulating a reciprocating element of an actual gun, of which at least a portion is externally visible; and operating means, driven by said actuating means, for reciprocating said means for simulating a reciprocating element.

17. A toy gun as recited in claim 16, in which said operating means are directly connected to said pendulum means for limiting the rate of longitudinal movement.

18. A toy gun as recited in claim 16, including means for producing a percussive sound; and means, driven by said actuating means, for operating said percussive sound producing means.

19. In a toy gun of the type having a longitudinally elongated rack, power means for moving said rack in one longitudinal direction, means driven by the rack for converting the longitudinal movement into cyclical movement to operate a cyclical sound producing means connected with and operated by said driven means, inertia means movable reversibly between two positions connected with said driven means to limit the rate of cyclical movement of said driven means and the rate of longitudinal movement of said rack, the improvements comprising rotary means driven by said rack, said rotary means including projection means extending therefrom, and means, operated from said projection means, for directly moving said sound producing means, said rotary means also moving said inertia means from one of said two positions to the other, and vice versa.

20. The gun of claim 19 including a cyclical sound producing means and lever means operatively connected to and actuatable by said rotary means for actuating said cyclical sound producing means.

21. In a toy gun, in combination, a longitudinally movable elongated rack, power means for moving said rack in one longitudinal direction, rotary means comprising a pair of interconnected wheels, having projection means extending therefrom, driven by said rack for converting said longitudinal movement into cyclical movement, a cyclical sound producing means connected with and driven by said projecting means, and reversible inertia means movable between two positions connected to be directly moved from one of said two positions to the other, and vice versa, by said projecting means to limit the rate of cyclical movement of said driven means and the rate of longitudinal movement of said rack.

22. The gun of claim 21 wherein said inertia means is in the form of a member, mounted for oscillatory movement, having connections to the rotary means whereby to cause said member to oscillate.

23. In a toy gun of the type having a longitudinally elongated rack, power means for moving said rack in one longitudinal direction, means driven by the rack for converting the longitudinal movement into cyclical movement to operate a cyclical sound producing means connected with and operated by said driven means, inertia means movable reversibly between two positions connected with said driven means to limit the rate of cyclical movement of said driven means and the rate of longitudinal movement of said rack, the improvements comprising rotary means driven by said rack, and means, operated from said rotary means, for driving said inertia means, said rotary means having a series of projections extending therefrom, and means engageable with the projections forming a part of the cyclical sound producing means.

References Cited in the file of this patent or the original patent

UNITED STATES PATENTS

| | | |
|---|---|---|
| 2,684,554 | Sigg | July 27, 1954 |
| 2,892,289 | Ryan | June 20, 1959 |